United States Patent
Byun et al.

(10) Patent No.: US 7,037,739 B2
(45) Date of Patent: May 2, 2006

(54) FABRICATION METHOD OF AN EPILAYER STRUCTURE INGAASP/INP RIDGE WAVEGUIDE PHASE MODULATOR WITH HIGH PHASE MODULATION EFFICIENCY

(75) Inventors: Young Tae Byun, Gyeonggi-do (KR); Hwa Sun Park, Seoul (KR); Seok Lee, Seoul (KR); Deok Ha Woo, Seoul (KR); Jong Chang Yi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 162 days.

(21) Appl. No.: 10/751,858

(22) Filed: Jan. 6, 2004

(65) Prior Publication Data

US 2005/0148107 A1    Jul. 7, 2005

(51) Int. Cl.
*H01L 21/00* (2006.01)

(52) U.S. Cl. ............................ 438/31; 438/29; 438/69

(58) Field of Classification Search ................. 438/29, 438/31, 69
See application file for complete search history.

(56) References Cited

U.S. PATENT DOCUMENTS

| | | | |
|---|---|---|---|
| 6,465,269 B1 * | 10/2002 | Furushima | 438/31 |
| 6,477,283 B1 * | 11/2002 | Shimizu et al. | 385/3 |
| 2003/0098475 A1 * | 5/2003 | Ueda | 257/233 |

* cited by examiner

*Primary Examiner*—Jennifer Kennedy
*Assistant Examiner*—Kyoung Lee
(74) *Attorney, Agent, or Firm*—Harness, Dickey & Pierce, P.L.C.

(57) ABSTRACT

A fabrication method of an epilayer structure for InGaAsP/InP ridge waveguide phase modulator with high phase modulation efficiency. It relates to a P-p-n-N InGaAsP/InP ridge waveguide phase modulator fabricated to be that the phase change of the TE-mode is linearly proportional to the reverse bias voltage at 1.55 μm wavelength. A method for fabricating an epilayer structure for achieving the optical confinement in the vertical direction of an InGaAsP/InP waveguide phase modulator, characterized by comprising the steps of: forming a first cladding layer of N-InP on an $N^+$-InP substrate; forming a first waveguide layer of n-InGaAsP and a second waveguide layer of p-InGaAsP in sequence on the first cladding layer; forming a second cladding layer of P-InP and a third cladding layer of P-InP in sequence on the second waveguide layer; and forming an electrode layer of $p^+$InGaAs on the third cladding layer.

2 Claims, 3 Drawing Sheets

FABRICATION METHOD OF AN EPILAYER STRUCTURE INGAASP/INP RIDGE WAVEGUIDE PHASE MODULATOR WITH HIGH PHASE MODULATION EFFICIENCY

BACKGROUND OF THE INVENTION

1. Field of the Invention

The present invention relates to a fabrication method of an epilayer structure for InGaAsP/InP ridge waveguide phase modulator with high phase modulation efficiency. In more detail, it relates to a P-p-n-N InGaAsP/InP double heterostructure (DH) ridge waveguide phase modulator, fabricated to be that phase change of the TE-mode is linearly proportional to reverse bias voltage at 1.55 μm wavelength, having high phase modulation efficiency.

2. Description of the Related Art

III–V compound semiconductors enable monolithic integration, which is unable in $LiNbO_3$, to save the expense and improve the reliability. In addition, on the contrary to an $LiNbO_3$ optical modulator simply using electro-optic effect for changing the refractive index of a waveguide, a optical modulator using III–V compound semiconductors can use free-carrier effect as well as electro-optic effect at the same time, and thus the larger change of the refractive index can be obtained. Consequently, the larger phase change can be obtained with low voltage.

As the refractive index of III–V compound semiconductor is changed, a phase modulation of the propagating optical wave is being occurred, and thus a phase modulator can be achieved. If a phase modulator is being combined with a Mach-Zehnder (MZ) interferometer or a directional coupler structure, an amplitude modulation and/or a switching can be obtained. Therefore, a phase modulator, among the various kinds of optical modulators, is a key external modulator for a high-speed optical communication and/or an optical signal processing system.

Recently, a waveguide phase modulator and a switch, based on GaAs and InP, are being popularly developed. Looking into the phase modulators based on GaAs, it is reported that, in a P-p-n-N GaAs/AlGaAs double heterostructure (DH) phase modulator, which increases the overlapping of the guided mode field and the applied electric field compared with the conventional P-n-N structure and takes advantages of electric field effect and free-carrier effect as well, the phase modulation efficiencies are measured to be 96°/V·mm at 1.06 μm wavelength [G. Mendoza-Alvarez, L. A. Coldren, A. Alping, R. H. Yan, Hausken, K. Lee, and K. Pedrotti, *IEEE J. Lightwave Technol.* LT-6, 798 (1988)] and 48.9°/V·mm at 1.31 μm wavelength[Y. Byun, K. Park, S. Kim, S. Choi, Y. Chung, and T. Lim, Ungyong Mulli (The Korean Physical Society), 10, 101 (1997)] respectively. Besides, a P-P-p-i-n-N-N GaAs/AlGaAs W-waveguide phase modulator shows the phase modulation efficiency of 34.6°/V·mm and the propagation loss of 0.2–0.6 dB/cm at 1.31 μm wavelength, which are the best characteristics reported up to the present[Y. Byun, K. Park, S. Kim, S. Choi, J. Yi, and T. Lim, *Appl. Opt.*, 37, 496 (1998)].

On the other hand, looking into the phase modulators based on InP, a P-i-n-N InGaAsP/InP phase modulator, which has double heterostructure, shows the phase modulation efficiency of 11°/V·mm for the TE mode at 1.52 μm wavelength [J. F. Vinchant, J. A. Caviles, M. Eman, P. Jarry, and M. Renaud, *IEEE J. Lightwave Technol.*, 10, 63 (1992)]. And an InGaAlAs/InP rib waveguide phase modulator, which has single heterostructure, shows comparatively low phase modulation efficiency of 5.5°/V·mm for the TE mode at 1.3 μm wavelength [S. -K. Han, R. V. Ramaswamy, W. -Q. Li, and P. K. Bhattacharya, *IEEE Photon. Technol. Lett.*, 5, 46 (1993)].

It is also reported that the phase modulation efficiency of an n-i-P InGaAs/InP MQW ridge phase modulator at 1.52 μm wavelength is 12°/V·mm [U. Koren, T. L. Koch, H. Presting, and B. I. Miller, *Appl. Phys. Lett.*, 50, 368 (1987)], and that of a P-n-i-n InGaAs/InP MQW ridge phase modulator at 1.55 μm wavelength is 39°/V·mm [H. K. Tsang, J. B. D. Soole, H. P. LeBlanc, R. Bhat, M. A. Koza, and I. H. White, *Appl. Phys. Lett.*, 57, 2285 (1990)]. However, the phase change of the latter for the TE mode is non-linear and proportional to square of reverse bias voltage. Thus, switching operation is obtained at the bias voltage as high as 5V.

Compared with the phase modulators based on GaAs, the phase modulators based on InP generally have low phase modulation efficiencies, and thus the switching voltages are comparatively high. And, a P-n-i-n InGaAs/InP MQW ridge phase modulator has comparatively high phase modulation efficiency as described above (39°/V·mm at 1.55 μm wavelength), however, the phase change as a function of the bias voltage is non-linear and bias voltage of 5V is always required for switching operation. Therefore, it is required to develop an optical modulator having low switching voltage, in which the phase is being changed linearly with the applied voltage.

SUMMARY OF THE INVENTION

The present invention is proposed to solve the problems of the prior art mentioned above. It is therefore the object of the present invention to provide a P-p-n-N InGaAsP/InP double heterostructure (DH) ridge waveguide phase modulator, having high phase modulation efficiency, in which the phase change for the TE mode is linearly proportional to the reverse bias-voltage at 1.55 μm wavelength.

To achieve the object mentioned above, the present invention provides a method for fabricating an epilayer structure for achieving the optical confinement in the vertical direction of an InGaAsP/InP waveguide phase modulator, characterized by comprising the steps of:

forming a first cladding layer of N-InP on an $N^+$-InP substrate;

forming a first waveguide layer of n-InGaAsP and a second waveguide layer of p-InGaAsP in sequence on the first cladding layer;

forming a second cladding layer of P-InP and a third cladding layer of P-InP in sequence on the second waveguide layer; and forming a $p^+$-InGaAs electrode layer on the third cladding layer.

DETAILED DESCRIPTION OF THE EMBODIMENTS

Hereinafter, referring to appended drawings,s the structures and operation principles of the embodiments of the present invention are described in detail.

In a phase modulator in accordance with the present invention, the total change of the refractive index is obtained by the summation of electric field effects(linear and quadratic electro-optic effect) and free-carrier effects (plasma effect and band-filling effect). The refractive index change caused by linear electro-optic (LEO) effect and quadratic electro-optic (QEO) effect is dependent upon the electric field strength, and thus when the thickness of depletion layer is small, the electric field strength gets to be strong and a large refractive index change is obtained.

On the other hand, the refractive index change caused by plasma (PL) effect and band-filling (BF) effect is proportional to the free carrier density, and thus the refractive index change becomes larger as the waveguide layer of the phase modulator is highly doped. Therefore, to fabricate a phase modulator with high phase modulation efficiency, various physical effects causing the refractive index change in a semiconductor waveguide should be used together.

That is to say, for effectively using electric field effect and free-carrier effect, both causing the refractive index change, a phase modulator is to be constituted to have a structure of a waveguide layer being doped and a p-n junction being located in the center of waveguide layer to increase the overlapping of the guided mode field and the applied electric field. Thus, a waveguide phase modulator has a P-p-n-N structure wherein p-InGaAsP and n-InGaAsP waveguide layers are inserted between P-InP and N-InP cladding layers.

Figure 1:
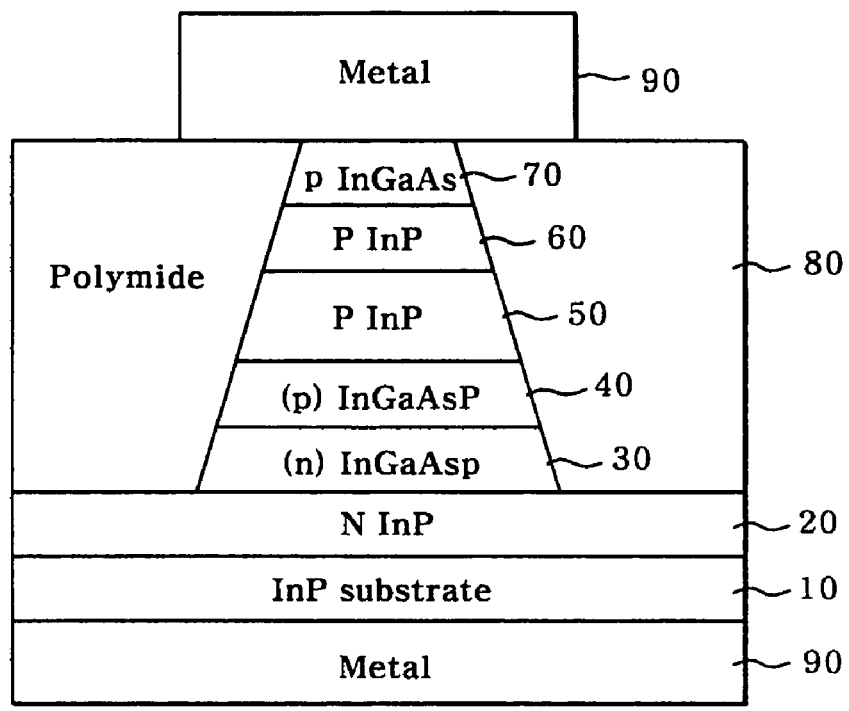
FIG. 1 is a view illustrating the two-dimensional waveguide cross-sectional structure of a P-p-n-N InGaAsP/InP ridge waveguide phase modulator in accordance with the present invention.

FIG. 1 is a view illustrating the two-dimensional waveguide cross-sectional structure of a P-p-n-N InGaAsP/InP DH ridge waveguide phase modulator in accordance with the present invention.

Looking into FIG. 1, the epilayers for achieving the optical confinement in the vertical direction are constituted of a first cladding layer (20) of 0.25 μm N-InP ($3\times10^{17}$ $cm^{-3}$), a first waveguide layer (30) of 0.25 μm n-InGaAsP ($1\times10^{17}$ $cm^{-3}$), a second waveguide layer (40) of 0.25 μm p-InGaAsP ($1\times10^{17}$ $cm^{-3}$), a second cladding layer (50) of 0.75 μm P-InP ($5\times10^{17}$ $cm^{-3}$), a third cladding layer (60) of 0.25 μm P-InP($3\times10^{18}$ $cm^{-3}$), and a cap layer (70) of 0.2 μm $p^+$-InGaAs($1\times10^{18}$ $cm^{-3}$) being laminated in sequence on an $N^+$-InP($2\times10^{18}$ $cm^{-3}$) substrate (10). The reference numeral 80 represents a polyimide film, and 90 represents a metal layer for electrode.

Here, the first and the second waveguide layers (30, 40) are formed of p-n homogeneous junction for using both electric field effect and free-carrier effect, and the $p^+$-InGaAs cap layer (70) is used for achieving a high-quality ohmic contacts.

For achieving the optical confinement in the horizontal direction, the difference of the effective refractive index in the horizontal direction is made up by etching technologies. In addition, for effectively applying the reverse bias voltage to the two-dimensional waveguide region only, the etch depth should be larger than the p-n junction interface, and thus a ridge waveguide structure is appropriate. Accordingly, the two dimensional cross-sectional structure of a waveguide is constituted of a ridge region corresponding to a waveguide and a cladding region adjacent to the ridge region. Here, the single mode waveguide condition is calculated by using a beam propagation method (BPM).

Figure 2:
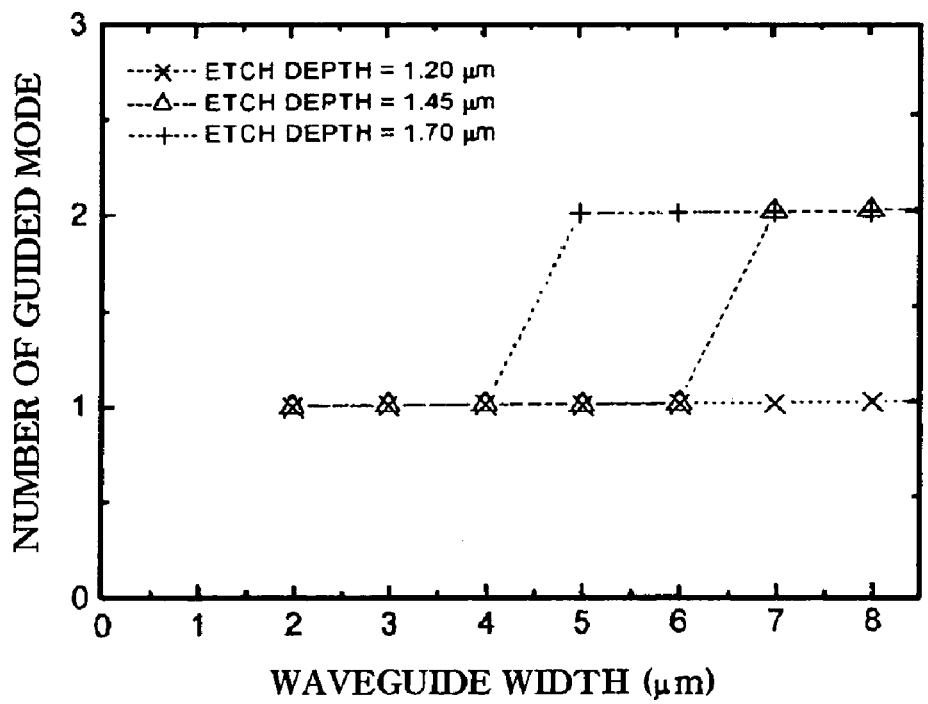
FIG. 2 is a graph showing the number of guided modes calculated as a function of the waveguide width by using a beam propagation method (BPM).

FIG. 2 shows the number of guided modes calculated by BPM as a function of the waveguide width at 1.55 μm wavelength. As shown in FIG. 2, a strip-loaded waveguide, whose etch depth(h) is 1.2 μm, transmits single mode only when the waveguide width(w) is less than 8 μm. On the other hand, a ridge waveguide (h=1.45 μm), which is etched to the interface of p-n junction in the waveguide layer, transmits single mode only when the waveguide width (w) is less than 6 μm. And, a ridge waveguide (h=1.7 μm), which is etched to the interface between the waveguide layer and the lower cladding layer, transmits single mode only when the waveguide width (w) is less than 4 μm.

The epilayers described in FIG. 1 were grown on an InP substrate (10) by metal organic chemical vapor deposition (MOCVD) method. In the case of TE-mode, LEO effect is added to free-carrier effect in [01$\bar{1}$] direction, and thus the waveguide was fabricated in [01$\bar{1}$] direction by using photolithography and wet-etching technique [Y. Byun, K. Park, S. Kim, S. Choi, Y. Chung, and T. Lim, Ungyong Mulli (The Korean Physical Society), 10, 101 (1997)].

Etching mask was made of $SiO_2$ thin-film with the thickness of 2500Å deposited by plasma enhanced chemical vapor deposition (PECVD) method. Nonselective etching solution was used for etching both InGaAsP (30, 40) and InP (50, 60). A sample has been etched for 20 minutes in a well-diluted $Br_2$:Methanol (4 ml:1000 ml) solution with 0.7 μm/min etching rate. The etch depth was controlled to be 1.7 μm for fabricating a ridge waveguide. Here, in case that the upper width of the fabricated ridge waveguide was 3 μm, the lower width was 6 μm.

After cleaning the etched sample, polyimide (80) was spin-coated thereon and hardened for constituting an electrode [Y. Byun, K. Park, S. Kim, S. Choi, J. Yi, and T. Lim, Appl. Opt., 37, 496 (1998)]. The coated polyimide was then etched by $O_2$ plasma using a reactive ion etching (RIE) equipment for the cap layer of the ridge waveguide to be exposed. Then, Ti (300Å)-Pt 150Å)-Au(3000Å) are deposited on the polyimide (80) to form a P-type ohmic electrode.

For easily obtaining mirror surfaces when cutting both ends of the phase modulator, the sample has been lapped and then polished to 120 μm thickness. Next, Ti(300Å)-Au(2000Å) are deposited on the polished $N^+$-InP substrate to form an N-type ohmic electrode. Finally, for completing the ohmic electrode, the sample has been thermally treated for 30 seconds at 360° C. by using a rapid thermal annealing (RTA) equipment. Then, the phase modulator was cut to 2 mm length and fixed on an Au-coated mount by silver (Ag) paste.

The waveguide section of the phase modulator fabricated as described above is not antireflection coated, and thus the optical length of the waveguide resonator is being changed when the effective refractive index is being changed by temperature, voltage, and/or wavelengths. Accordingly, it becomes a Fabry-Perot (FP) resonator. The interference fringes of a FP resonator, formed by a waveguide and both of its end facet, are phase-changed according to the reverse bias voltage.

In case that no optical loss is assumed in a waveguide, the intensity of transmitted light in a FP resonator is given by the following equation [Y. Byun, K. Park, S. Kim, S. Choi, Y. Chung, and T. Lim, Ungyong Mulli (The Korean Physical Society), 10, 101 (1997)]:

$$T = \frac{P_{out}}{P_{in}} = \frac{(1-R)^2}{1 - 2R\cos 2E\left(\frac{2\pi nl}{\lambda}\right) + R^2}, \quad \text{[Equation 1]}$$

where, R is the facet reflectivity, l is the length of the waveguide resonator, n is effective refractive index, and λ is wavelength.

In Equation 1, when the applied voltage is 0V, if the wavelength of the incident light is changed, the intensity of output light of FP resonator is changed, and thus FP fringe spacing, $\Delta\lambda_{FP}$, is obtained. $\Delta\lambda_{FP}$ is the wavelength spacing when the amount of phase change is π. If the applied voltage is larger than 0V, FP fringe is moved, and in consequence, wavelength fringe shift is occurred. Accordingly, phase modulation efficiency can be obtained by measuring the FP fringe shift with changing the applied voltage. FP fringe spacing ($\Delta\lambda_{FP}$) and phase modulation efficiency ($\Delta\Phi(V)$) are given by the following equations:

$$\Delta\lambda_{FP} = \frac{\lambda^2}{2n_g l}, \quad \text{and} \qquad \text{[Equation 2]}$$

$$\Delta\Phi(V) = \frac{\pi\Delta\lambda(V)}{\Delta\lambda_{FP}}, \qquad \text{[Equation 3]}$$

where, $\Delta\lambda(V)$ is wavelength fringe shift according to the voltage and $n_g$ is group index $n_g$ can be obtained from FP fringe spacing ($\Delta\lambda_{FP}$).

The phase modulation efficiency of a phase modulator can be measured by using a MZ interferometer or a FP interferometer. In the present invention, the phase change of the fabricated phase modulator was measured at 1.55 μm wavelength by a FP interferometer.

Figure 3:
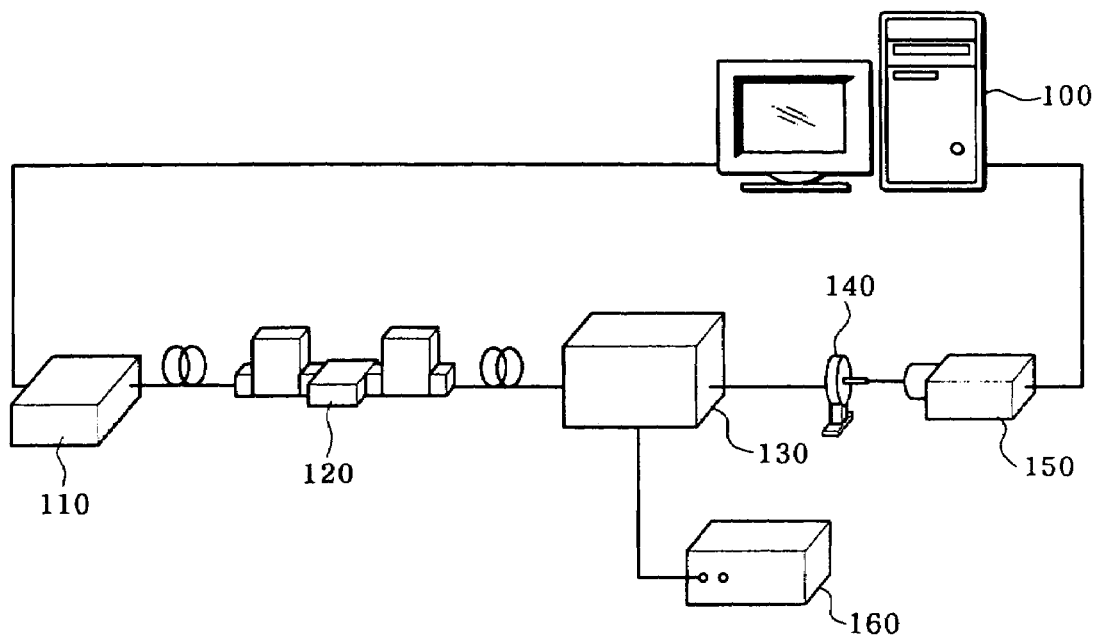
FIG. 3 is a view illustrating the structure of an apparatus for Fabry-Perot resonance experiment for measuring the phase modulation efficiency.

FIG. 3 is a view illustrating the structure of an apparatus for Fabry-Perot resonance experiment for measuring the phase modulation efficiency.

As described in FIG. 3, the output light of a wavelength tunable laser (110) with the tunable range of 1500 nm~1570 nm is endfire-coupled to the incident facet of a phase modulator by a lensed-fiber. The incident light is polarized to be TE-mode by a polarization controller (120). The output light of the phase modulator is magnified by a ×40 object lens (140) and then displayed on a computer monitor (100) connected to an IR CCD camera (150). The reference numeral 130 represents an optical device alignment setup and 160 represents a power source.

It was experimentally confirmed that the fabricated phase modulator propagated single mode only because the higher-order modes of the light incident to the waveguide was not excited from near-field pattern. Then, for measuring the phase modulation efficiency, with increasing the wavelength by 0.02 nm interval from 1550 nm to 1550.5 nm and changing the reverse bias voltage ($V_b$) by 1V interval from 0V to 4V, FP interference fringes are measured as a function of wavelength at each voltage.

Figure 4:
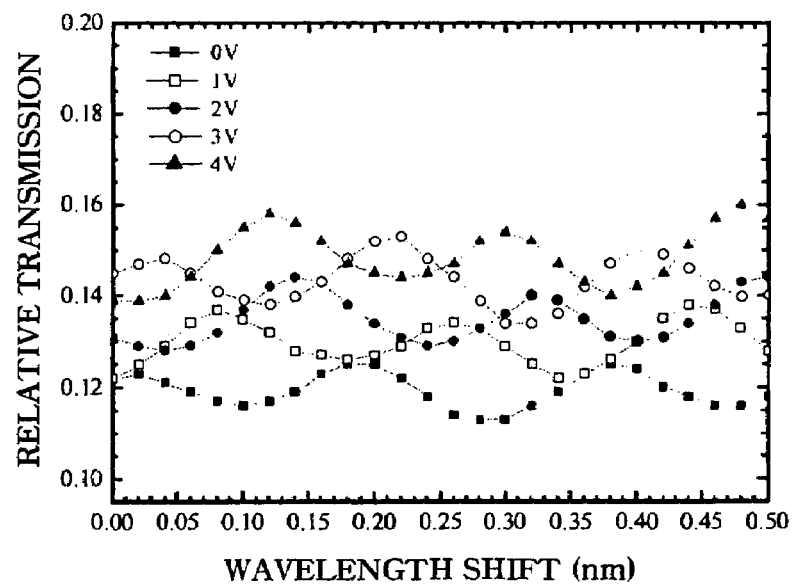
FIG. 4 is a graph showing the Fabry-Perot interference fringe of output light measured as a function of the wavelength shift.

FIG. 4 shows the Fabry-Perot interference fringes of output light measured as a function of the wavelength shift in the phase modulator of the present invention. FP interference fringes were measured on TE-polarized light when the output power of the wavelength tunable laser is 0.6 mW.

Looking into FIG. 4, the transmission is increased with $V_b$ being increased. This phenomenon can be explained as follows: Since the waveguide layer is constituted of p-n junction and the doping concentrations of p-layer and n-layer are $1 \times 10^{17}$ cm$^{-3}$ respectively, the transmitted intensity at 0V is weak due to the absorption loss caused by free-carriers when there is no applied voltage. However, since the thickness of depletion layer, where no free-carrier being exist, is being increased as $V_b$ is increased, the absorption loss in waveguide layer is decreased, and thus the transmission is increased when $V_b$ is increased.

When $V_b$ is 0V, the FP fringe spacing ($\Delta\lambda_{FP}$), measured in FIG. 4, is 0.185 nm, and thus, according to Equation 2, the group index ($n_g$) is 3.24. Then, the phase change ($\Delta\Phi$) is determined by Equation 3 using the FP interference fringe shift ($\Delta\lambda$), measured at each voltage as $V_b$ is being increased, with the basis of FP interference fringe measured at 0V.

Figure 5:
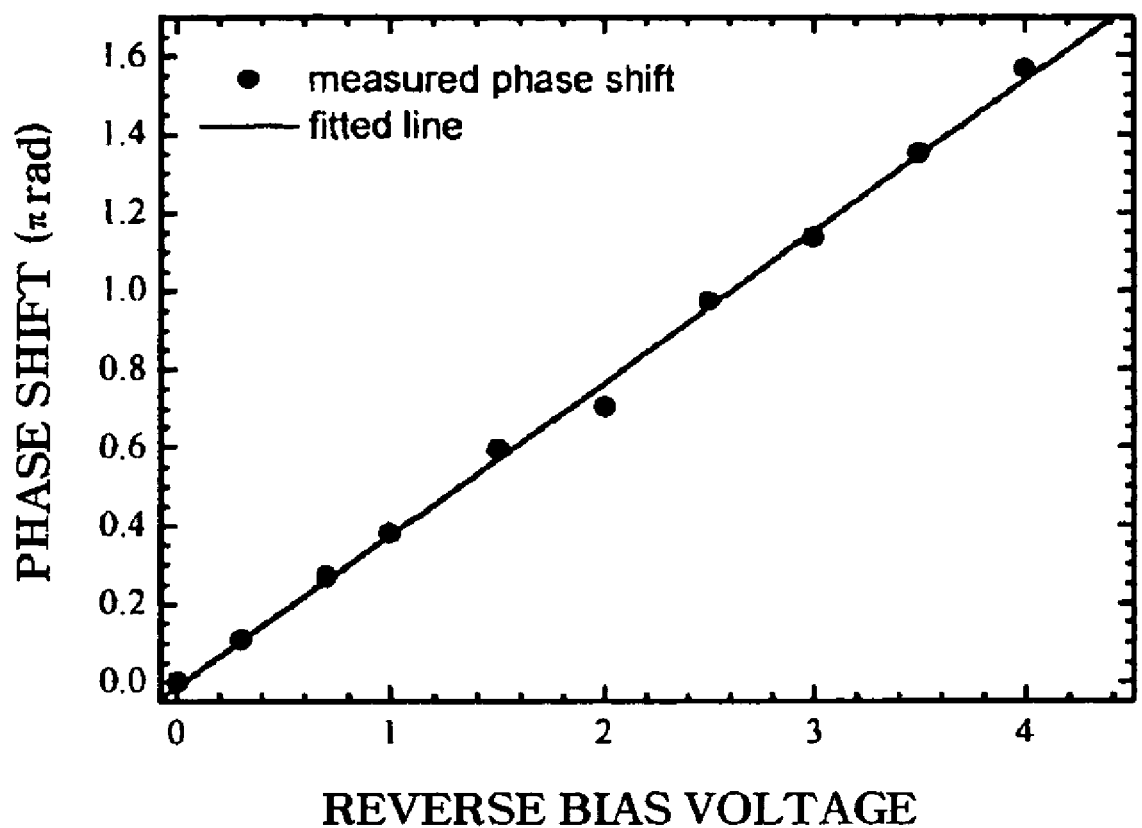
FIG. 5 is a graph showing the phase change of the TE mode measured as a function of the reverse bias voltage.

FIG. 5 shows the phase change of the TE-mode measured as a function of $V_b$ at 1550 nm wavelength. It can be noticed in FIG. 5 that the phase change is almost linearly increased as the reverse bias voltage is increased.

This can be comprehended qualitatively as follows: When the propagating direction of the incident light is [01$\bar{1}$], the phase change of the TE-mode is obtained by the summation of the phase changes caused by LEO effect, QEO effect, PL effect, and BF effect. LEO effect is proportional to the reverse bias voltage(i.e., linear), and QEO effect is proportional to $\sqrt[3]{V_b}$ (i.e., superlinear). In addition, BF and PL effects are proportional to $\sqrt{V_b}$ (i.e., superlinear). Thus, the sum of the phase changes by LEO, QEO, PL, and BF effects is almost linearly increased as the reverse bias voltage is increased[G. Mendoza-Alvarez, L. A. Coldren, A. Alping, R. H. Yan, Hausken, K. Lee, and K. Pedrotti, *IEEE J. Lightwave Technol*. LT-6, 798 (1988)].

Since the switching voltage ($V_\pi$) of the phase modulator in FIG. 5 is 2.6V, the phase modulation efficiency is comparatively high, 34.6°/V·mm. This efficiency is the highest among those of the bulk-type phase modulators based on InP. In other words, it is about three times higher than that(11°/V·mm) of a similar epilayer-structured(except the doping structure) phase modulator reported in the prior art [J. F. Vinchant, J. A. Caviles, M. Eman, P. Jarry, and M. Renaud, *IEEE J. Lightwave Technol.*, 10, 63 (1992)].

The phase modulation efficiency of an InGaAs/InP MQW ridge phase modulator reported by Tsang et al. [H. K. Tsang, J. B. D. Soole, H. P. LeBlanc, R. Bhat, M. A. Koza, and I. H. White, *Appl. Phys. Lett.*, 57, 2285 (1990)] is a little higher than that of the present invention, however, the phase change thereof is proportional to the square of applied voltage, and thus it has a disadvantage that, for using a low switching voltage (1.15V), a high bias voltage (5V) should be applied. On the other hand, the present invention does not require an extra bias voltage because the phase change is linearly proportional to the applied voltage, and thus the switching operation can be easily obtained at 0V and 2.6V.

As mentioned thereinbefore, if a phase modulator, fabricated by using III–V compound semiconductors, is being combined with a Mach-Zehnder (MZ) interferometer or a directional coupler structure, an amplitude modulation and/ or a switching can be obtained. Therefore, a phase modulator, among the various kinds of optical modulators, is a key external modulator for a high-speed optical communication and/or an optical signal processing system. In the present invention, the switching voltage is as low as 2.6V at 1.55 μm wavelength, and thus it can be easily applied to the development of a high-speed optical modulator.

Besides, III–V compound semiconductors enable monolithic integration, which is unable in LiNbO$_3$, to save the expense and improve the reliability. The phase modulator in accordance with the present invention is based on InP, and thus it can be monolithically integrated with active optical devices such as a laser diode being operated at 1.55 μm wavelength and/or a photodetector.

Since those having ordinary knowledge and skill in the art of the present invention will recognize additional modifications and applications within the scope thereof, the present invention is not limited to the embodiments and drawings described above.

What is claimed is:

1. A method for fabricating an epilayer structure for achieving the optical confinement in the vertical direction of an InGaAsP/InP waveguide phase modulator, characterized by comprising the steps of:
    forming a first cladding layer of N-InP on an N$^+$-InP substrate;
    forming a first waveguide layer of N-InGaAsP and a second waveguide layer of P-InGaAsP in sequence on said first cladding layer;
    forming a second cladding layer of P-InP and a third cladding layer of P-InP in sequence on said second waveguide layer;
    forming an electrode layer of p$^+$-InGaAs on said third cladding layer; and
    characterized in that said first and second waveguide layers are constituted of p-n homogeneous junctions for taking advantage of electric field effect and free-carrier effect.

2. A method for fabricating an epilayer structure for achieving the optical confinement in the vertical direction of an InGaAsP/InP waveguide phase modulator, characterized by comprising the steps of:
    forming a first cladding layer of N-InP on an N$^+$-InP substrate;
    forming a first waveguide layer of n-InGaAsP and a second waveguide layer of p-InGaAsP in sequence on said first cladding layer;
    forming a second cladding layer of P-InP and a third cladding layer of P-InP in sequence on said second waveguide layer;
    forming an electrode layer of p$^+$-InGaAs on said third cladding layer; and
    characterized in that the phase change in said epilayers of said phase modulator is designed to be linearly proportional to applied voltage, so that optical switching operation is obtained at 0 V and 2.6 V without requiring any extra bias voltage.

* * * * *